United States Patent [19]
Sung

[11] Patent Number: 5,348,177
[45] Date of Patent: Sep. 20, 1994

[54] FUEL BACKWARD FLOW-PREVENTING DEVICE FOR USE IN AN AUTOMOTIVE VEHICLE

[75] Inventor: Younkwan Sung, Ulsan, Rep. of Korea

[73] Assignee: Hyundai Motor Company, Seoul, Rep. of Korea

[21] Appl. No.: 164,942

[22] Filed: Dec. 10, 1993

[30] Foreign Application Priority Data

Dec. 12, 1992 [KR] Rep. of Korea ............ 92-25273[U]

[51] Int. Cl.5 .......................................... F16K 17/00
[52] U.S. Cl. .................................................. 220/86.2
[58] Field of Search .................. 220/86.1, 86.2, 86.3, 220/4.14, 202, 345; 137/41, 433

[56] References Cited

U.S. PATENT DOCUMENTS

| | | | |
|---|---|---|---|
| 2,223,509 | 12/1940 | Brauer | 137/433 X |
| 3,084,706 | 4/1963 | Lunde | 220/202 X |
| 3,727,452 | 4/1973 | Baumgarten | 137/433 X |
| 3,752,355 | 8/1973 | Weissenbach | 220/86.1 |
| 4,646,772 | 3/1987 | Bergsma | 220/202 X |
| 4,822,054 | 4/1989 | Christner et al. | |

*Primary Examiner*—Steven M. Pollard
*Attorney, Agent, or Firm*—Birch, Stewart, Kolasch & Birch

[57] ABSTRACT

The present invention discloses a fuel backward flow-preventing device for use in an automotive vehicle of the present invention, comprising: a fuel filler and a fuel tank; a guide member connected to an inside portion of the fuel filler and having a plurality of slits and a plurality of passages; a floater member having projections slidably combined to the slits and ascending according to a fuel volume to block the passages; and a coupling means for connecting the inside portion of the fuel filler to the guide member lengthwise.

8 Claims, 3 Drawing Sheets

FUEL BACKWARD FLOW-PREVENTING DEVICE FOR USE IN AN AUTOMOTIVE VEHICLE

BACKGROUND OF THE INVENTION (1). Field of the Invention

The present invention relates to a fuel backward flow-preventing device for use in an automotive vehicle. More particularly, it relates to a fuel backward flow-preventing device for preventing an injected fuel from being expelled back due to the rise of a pressure in a fuel tank at the time of completing the supply of the fuel.

(2). Description of the Prior Art

A fuel tank installed in an automotive vehicle is generally disposed on a lower part of the vehicle, and an inlet of a fuel filler is connected to a filler hose to supply the fuel at a position higher than the fuel tank. The fuel that passes through the inlet flows into the fuel tank at too fast a rate, and the pressure of the air present in the fuel tank is increased by overfilling the fuel tank.

The rise of the pressure inside the fuel tank may cause "burping"; a condition whereby small portions of the fuel are expelled back through the filler tube and inlet of the fuel filler.

A method for preventing the "burping" at the time of the supply of the fuel is disclosed in U.S. Pat. No. 4,822,054.

SUMMARY OF THE INVENTION

The present invention provides a fuel backward flow-preventing device for use in an automotive vehicle for preventing a fuel from being expelled back due to the rise of pressure inside a fuel tank by blocking an inlet of a fuel filler according as the fuel is supplied and increased in the fuel tank. In order to achieve the above-mentioned object, a fuel backward flow-preventing device for use in an automotive vehicle of the present invention, comprises:

a fuel filler and a fuel tank;

a guide member connected to an inside portion of the fuel filler and having a plurality of slits and a plurality of passages;

a floater member having projections slidably combined to the slits and ascending according to a fuel volume to block the passages; and a coupling means for connecting the inside portion of the fuel filler to the guide member lengthwise.

The floater member has a cone-shaped configuration order to reduce a floating resistance at the time of the supply of the fuel.

The floater member is disposed in a posture that its inside contacts the fuel of the fuel tank and its outside contacts a supplied fuel, and the guide member is combined with the outside of the fuel filler.

The coupling means is integrally formed with grooves formed on the fuel filler and the guide member, and includes arms having hooks inserted elastically into the grooves.

The floater member has a space where air is present between its inside and the fuel surface of the fuel tank.

The guide member has flanges for preventing the floater member from being alienated on its lower portion, and the passages have a length where the floater member is blocked, with being disposed on the top.

In accordance with the fuel backward flow-preventing device of the present invention having the structure as mentioned above, the floater member ascends toward the fuel filler according to guidance of the guide member by buoyancy of the fuel that is supplied to the fuel tank and block the fuel supply passage at the time of the completion of the supply of the fuel. There can be prevented the fuel from being expelled back due to the rise of the pressure inside the fuel tank.

PREFERRED EMBODIMENTS OF THE PRESENT INVENTION

Figure 1:
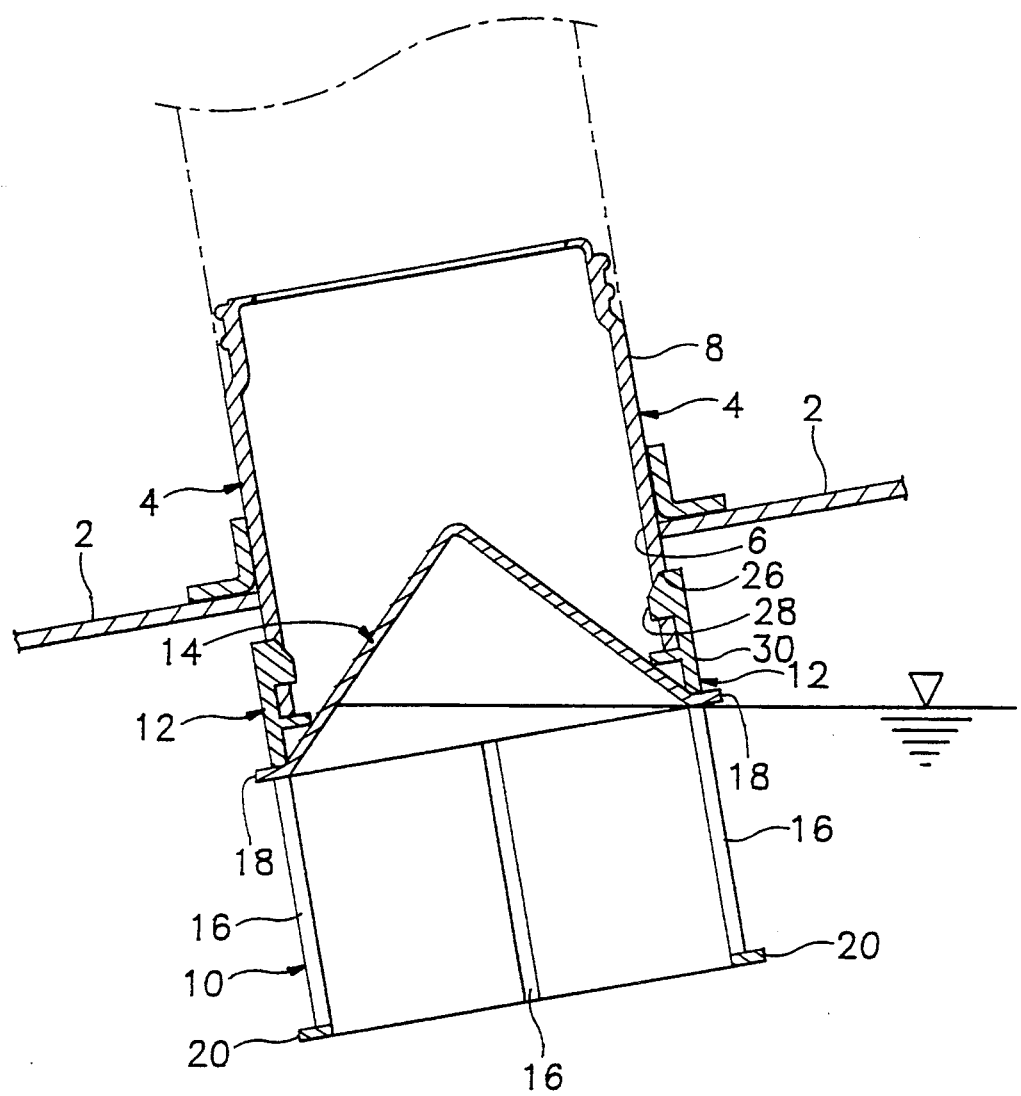
FIG. 1 is a side-sectional view of a fuel backward flow-preventing device in accordance with the present invention.

FIG. 1 is a side-sectional view of a fuel backward flow-preventing device of the present invention, and an on-board of a fuel tank designated by reference numeral "2" is appeared therein.

The fuel backward flow-preventing device of the present invention may be applied to all kinds of automotive vehicles because the device is used, having no connection with the configuration of the fuel tank.

A fuel filler 4 for supply of e fuel is installed in the fuel tank 2, and the fuel filler 4 includes an inside portion 6 whose lower end is positioned inside the fuel tank 2 and an outside portion 8 that is positioned outside the fuel tank 2.

A check valve 10 is installed in the inside portion 6, and the fuel flowing through the fuel filler 4 can be injected into the fuel tank 2. And, on the contrary, the fuel cannot flow backward from the fuel tank 2 to the outside.

The check valve 10 of the present invention includes a guide member 12 connected and fixed to the inside portion 6 of the fuel filler 4 lengthwise and a floater member 14 that lifts according to the fuel volume of the fuel tank 2 by guidance of the guide member 12.

Figure 2:
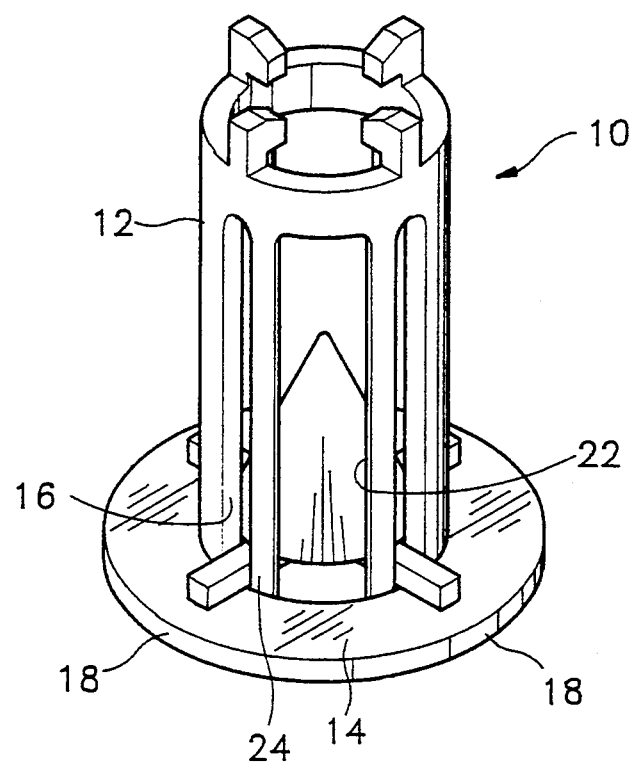
FIG. 2 is a perspective view of a check valve means of the present invention.

The guide member 12 has slits 16 formed lengthwise, and a plurality of slits are formed on a circumference of the guide member 12, as shown in FIG. 2.

The floater member 14 includes a projection 18 that is inserted into the slits 16 of the guide member 12 and slides, and the lengths of the slits 16 are determined in order that the floater member 14 stops to lift at the time of the completion of the supply of the fuel, when the projection 18 moves along the slits 16.

When the fuel inside the fuel tank 2 is exhausted by driving of the internal combustion engine and the fuel volume inside the fuel tank is decreased, flanges 20 for preventing the floater member 14 from being separated from the guide member 12 is integrally formed on the lower portion of the guide member 12.

The floater member 14 minimizes the floating resistance of the fuel supplied through the fuel filler 4, and has a configuration of cone in order to prevent that the fuel inside the fuel tank 2 flows reversely.

The outside surface of the cone-shaped floater member 14 contacts the fuel that flows into the fuel tank 2, and the inside surface of the floater member 14 contacts the fuel inside the fuel tank 2.

According to such a structure, friction resistance may be reduced at the time of the supply of the fuel, and the fuel's being expelled back inside the fuel tank may be prevented.

The fuel flowing through the fuel filler 4 descends pushing the cone-shaped floater member 14. When the floater member 14 is located on the top, the fuel filler 4 and fuel tank 2 are blocked. A plurality of passages 22 are provided in the guide member 12 such that the fuel filler and fuel tank are opened and the fuel flows into the fuel tank 2, from where the floater member 14 moves downward a little.

These passages 22 are formed broadly in the range that ribs 24 formed between the slits 16 have a width that is not deformed by a force of movement of the floater member 14.

Forming the width of the passages 22 as broad as possible has an advantage of the speedy fuel supply by minimizing the floating resistance of the fuel at the time of the supply of the fuel.

A plurality of grooves 26 are formed on the inside portion of the fuel filler 4 in order to connect the fuel filler 4 to the guide member 12. Fingers 30 having hooks 28 protruded inwardly and combined with the grooves elastically are formed integrally on the upper part of the guide member 12.

As such coupling means, hooks may be formed in the inside portion 6 of the fuel filler 2 and grooves may be formed on the guide member 12. It is important that the guide member 12 is inserted to the outside of the fuel filler 4 to reduce the floating resistance of the fuel at the time of the supply of the fuel.

Figure 3:
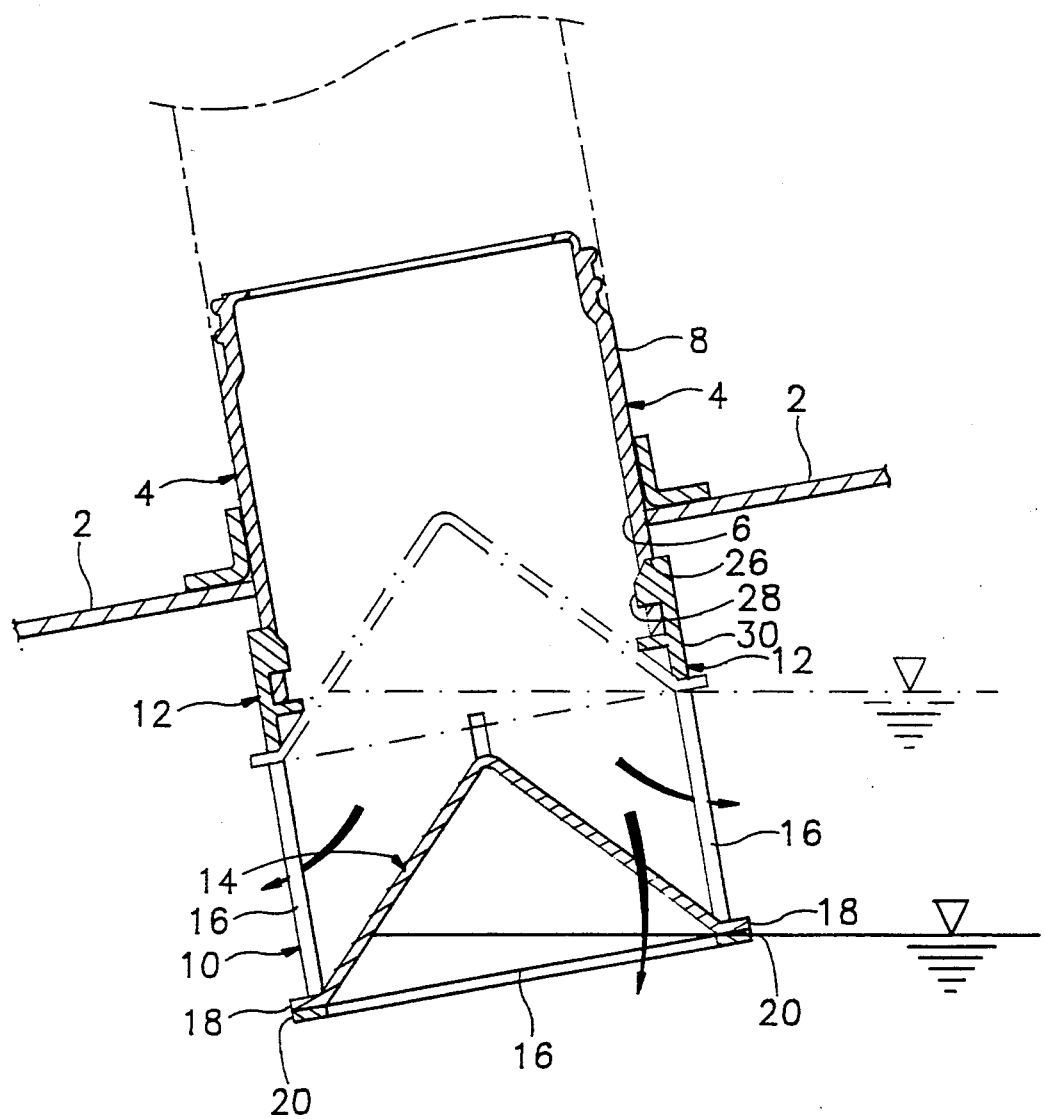
FIG. 3 depicts an operation of the fuel backward flow-preventing device in accordance with the present invention.

The fuel backward flow-preventing device for an automotive vehicle passes through the fuel filler 4 too rapidly, and the floater member 14 descends downward as shown in FIG. 3, when the fuel volume is small in the fuel tank 2.

If the fuel volume is increased in the fuel tank 2, the floater member 14 ascends gradually. If the floater member 14 ascends, the opened portion of the passage 22 is reduced gradually, and if the projection 18 of the floater member 14 gets to the top of the slit 16, the passages 22 are blocked by the floater member to stop the supply of the fuel.

The pressure of the air is increased inside the fuel tank 2, and the fuel will be expelled back. But since the passages 22 are blocked, the backward flow of the fuel does not happen.

As mentioned above, in the floater member 14 that ascends according to the increase of the fuel volume at the time of the supply of the fuel, its inside of a cone-configuration is separated from the surface of the fuel to form a space H. Since the air is present in this space H, the floater member 14 may ascend smoothly by the air rather than by buoyancy of the fuel.

In the fuel backward flow-preventing device of the present invention, when the fuel is supplied via a dispensing nozzle from a supply reservoir to the fuel tank 2 installed in the vehicle, if the supply of the fuel amounts to a predetermined level, the floater member blocks the passage to which the fuel is supplied. Thus, the backward flow of the fuel may be prevented by the rise of the pressure in the fuel tank.

There can be prevented the circumference of the fuel supply reservoir from being polluted by the fuel, and the sanitation of a fuel supplier may be attended to.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is

1. A fuel backward flow-preventing device for use in an automotive vehicle, comprising:
  a fuel filler and a fuel tank;
  a guide member connected to an inside portion of said fuel filler and having a plurality of slits and a plurality of passages;
  a floater member having projections slidably combined to said slits and ascending according to a fuel volume to block said passages; and
  a coupling means for connecting said inside portion of said fuel filler to said guide member lengthwise.

2. The device according to claim 1, wherein said floater member has a cone-shaped configuration in order to reduce a floating resistance at the time of the supply of the fuel.

3. The device according to claim 1, wherein said floater member is disposed in a posture that its inside contacts the fuel of the fuel tank and its outside contacts a supplied fuel.

4. The device according to claim 1, wherein said guide member is combined with the outside of the fuel filler.

5. The device according to claim 1, wherein said coupling means is integrally formed with grooves formed on the fuel filler and the guide member, and includes arms having hooks inserted elastically into said grooves.

6. The device according to claim 1, wherein said floater member has a space where air is present between its inside and the fuel surface of the fuel tank.

7. The device according to claim 1, wherein said guide member has flanges for preventing the floater member from being alienated on its lower portion.

8. The device according to claim 1, wherein said passages have a length where the floater member is blocked, with being disposed on the top.

* * * * *